(12) United States Patent
Gale et al.

(10) Patent No.: US 8,405,347 B2
(45) Date of Patent: Mar. 26, 2013

(54) INPUT VOLTAGE BASED SYSTEM AND METHOD FOR CHARGING A VEHICLE BATTERY

(75) Inventors: Allan Roy Gale, Livonia, MI (US); Paul Theodore Momcilovich, Tecumseh, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/897,323

(22) Filed: Oct. 4, 2010

(65) Prior Publication Data

US 2011/0163715 A1  Jul. 7, 2011

(51) Int. Cl.
*H02J 7/00* (2006.01)
(52) U.S. Cl. .......................................... 320/109
(58) Field of Classification Search ................... 320/109
See application file for complete search history.

(56) References Cited

U.S. PATENT DOCUMENTS

| | | | | |
|---|---|---|---|---|
| 3,921,197 A | * | 11/1975 | Horvath | 363/17 |
| 5,548,200 A | * | 8/1996 | Nor et al. | 320/109 |
| 2007/0194759 A1 | * | 8/2007 | Shimizu et al. | 320/166 |
| 2007/0263420 A1 | | 11/2007 | Nate et al. | |
| 2009/0121659 A1 | | 5/2009 | Oyobe et al. | |
| 2010/0013556 A1 | * | 1/2010 | Aiba | 330/253 |
| 2010/0109436 A1 | * | 5/2010 | Lanni | 307/31 |

FOREIGN PATENT DOCUMENTS

| | | |
|---|---|---|
| AU | 2006295965 A1 | 4/2007 |
| CA | 2621246 A1 | 4/2007 |
| CN | 101071950 A | 11/2007 |
| CN | 101277839 A | 10/2008 |
| EP | 1928689 A1 | 6/2008 |
| EP | 2178187 A1 | 4/2010 |
| JP | 2007097342 A | 4/2007 |
| JP | 2007306663 A | 11/2007 |
| JP | 2007306664 A | 11/2007 |
| JP | 2009044930 A | 2/2009 |
| KR | 20080065990 A | 7/2008 |
| WO | 2007037240 A1 | 4/2007 |
| WO | 2009022542 A1 | 2/2009 |

* cited by examiner

*Primary Examiner* — Arun Williams
(74) *Attorney, Agent, or Firm* — David B. Kelley; Brooks Kushman P.C.

(57) ABSTRACT

An automotive vehicle power system includes a battery charger having an input and output. The battery charger receives electrical energy via the input when the input is electrically connected with an electrical energy source. The battery charger also reduces a current provided at the output from a commanded value to a target value that varies according to a voltage at the input if the voltage at the input falls within a predetermined range of voltages.

18 Claims, 2 Drawing Sheets

INPUT VOLTAGE BASED SYSTEM AND METHOD FOR CHARGING A VEHICLE BATTERY

STATEMENT REGARDING FEDERALLY SPONSORED RESEARCH OR DEVELOPMENT

The invention was made with Government support under Contract No. DE-FC26-08NT04384. The Government has certain rights to the invention.

BACKGROUND

Plug-in hybrid electric vehicles and battery electric vehicles typically include a battery charger that may receive electrical energy from an electrical grid via a wall outlet and provide electrical energy to a traction battery and/or other electrical loads.

SUMMARY

A vehicle may include a traction battery and a battery charger. The battery charger may receive electrical energy from an electrical energy source if electrically connected with the electrical energy source and provide a current to the traction battery at a target value. The target value may vary according to a voltage associated with the electrical energy if the voltage associated with the electrical energy falls within a predetermined range of voltages.

A method of charging a vehicle battery may include determining a voltage on an AC power line electrically connected with an electrical energy source, determining whether the voltage falls within a predetermined range of voltages, and outputting a current to a vehicle traction battery at a target value that varies according to the voltage if the voltage falls within the predetermined range of voltages.

DETAILED DESCRIPTION

Testing of plug-in hybrid electric vehicles has shown that there are instances when the voltage to the battery charger falls below acceptable levels. It is fairly well accepted, for example, that a voltage of 80 $V_{AC}$ and lower on a nominal 120 $V_{AC}$ line is considered a brown out condition. During such an event, the battery charger is typically designed to discontinue charging and wait for the brown out condition to end.

There are other instances that can cause a low voltage condition, the most significant being an excessively long wire distance between the AC fuse box and the battery charger. If there is excessive distance, a naturally occurring voltage drop during charging can be interpreted by the battery charger as a brown out condition. When the battery charger discontinues charging, the voltage may immediately be restored causing the battery charger to return to charging—only to create another low voltage condition. This repetitive action may cause light flicker and other undesirable effects.

To control the above described repetitive activation, certain embodiments disclosed herein may implement a control strategy in which the battery charger or other controller(s), on detecting a continuous voltage of, for example, 100 $V_{AC}$ or lower, first reduces a low voltage/auxiliary battery charge voltage from a nominal charging voltage of, for example, 14 $V_{DC}$ to a charge sustaining voltage of, for example, 13.2 $V_{DC}$. Then the battery charger or other controller(s) begins to control its high voltage battery charge rate proportional to the AC line voltage such that, for example, 90 $V_{AC}$ is no charge and 100 $V_{AC}$ is the fully commanded high voltage battery charge rate. The low voltage battery charge rate may be restored when the AC line voltage has increased a suitable amount above the 100 $V_{AC}$ point (e.g., 105 $V_{AC}$). Other values and limits are, of course, also possible. Testing has shown that the charge control using such a strategy remains stable with no light flicker or undesirable effects other than a reduced charge rate during low voltage conditions.

Figure 1:
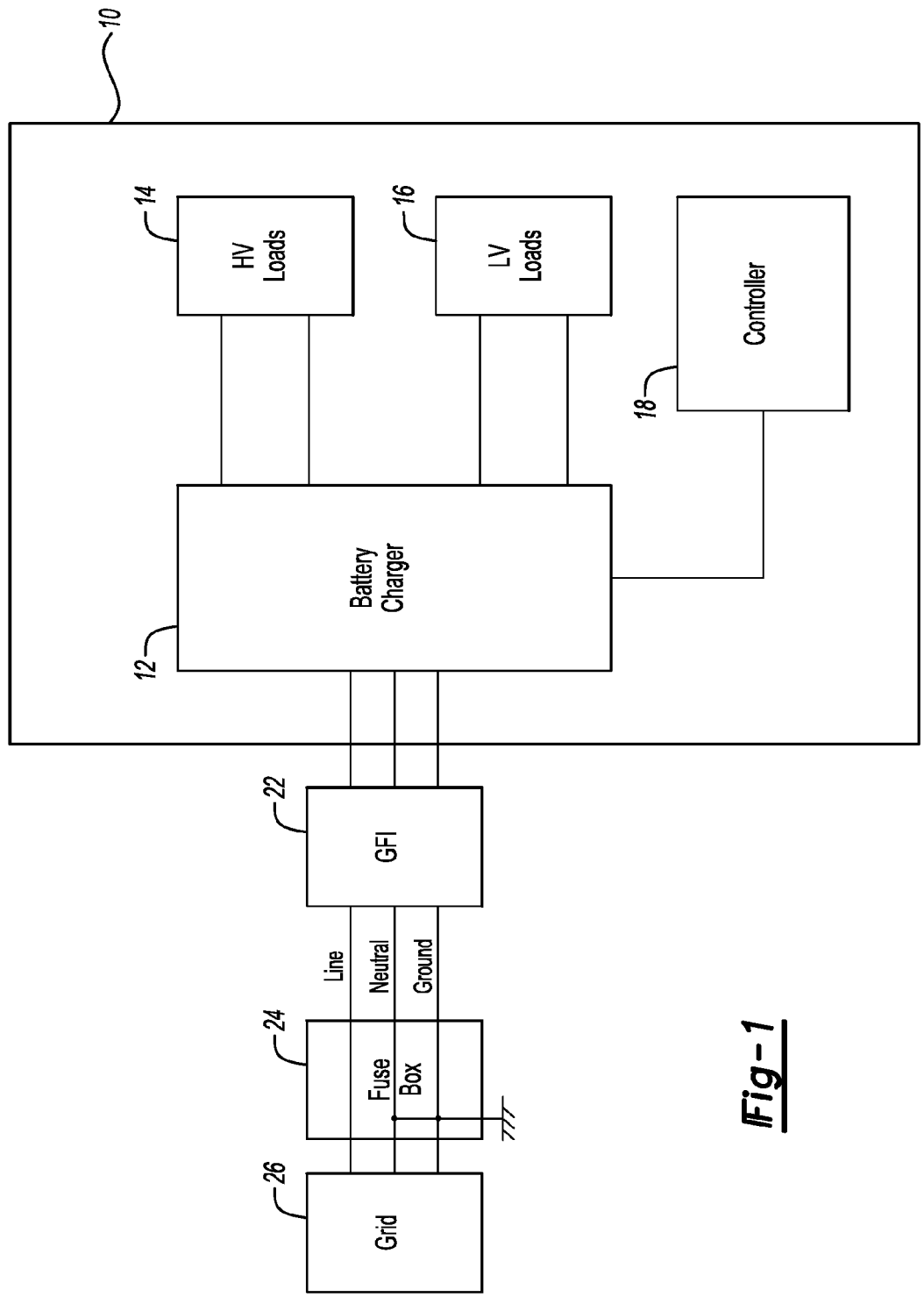
FIG. 1 is a block diagram of an automotive vehicle electrically connected with an electrical grid.

Referring to FIG. 1, a vehicle 10 (e.g., battery electric vehicle, plug-in hybrid electric vehicle, etc.) includes, a battery charger 12, high voltage loads 14 (e.g., traction battery, electric machine, etc.) and low voltage loads 16 (e.g., auxiliary battery, logic circuitry, etc.) The battery charger 12 is electrically connected with the high voltage loads 14 and low voltage loads 16. The vehicle 10 also includes a controller 18. The battery charger 12 is in communication with/under the control of the controller 18. Other arrangements including a different number of loads, chargers, controllers, etc. are also possible.

The battery charger 12 is configured to receive electrical power from an electrical grid 26 (or other electrical energy source). That is, the vehicle 10 may be plugged into a wall outlet such that the battery charger 12 is electrically connected with the electrical grid 26 via, in this example, a ground fault interrupter (GFI) 22 (or similar device) and fuse box 24. Line, neutral and ground wires are shown, in this example, electrically connecting the battery charger 12 and grid 26. The ground wire is electrically connected to a chassis (not shown) within the vehicle 10. The ground wire is also electrically connected with the neutral wire and ground at the fuse box 24. Other electrical configurations, such as a 240 V arrangement with L1, L2 and ground wires, are of course also possible.

The controller 18 may command that electrical energy be provided to either/both of the loads 14, 16. For example, the controller 18 may command the battery charger 12 to provide a specified charge current to the traction battery 14 and/or a specified charge voltage to the auxiliary battery 16. Hence in the embodiment of FIG. 1, the battery charger 12 controls the high voltage output current and low voltage output voltage set point. The battery charger 12, in other embodiments, may control high voltage output current and/or voltage set point and low voltage output current and/or voltage set point as desired.

Figure 2:
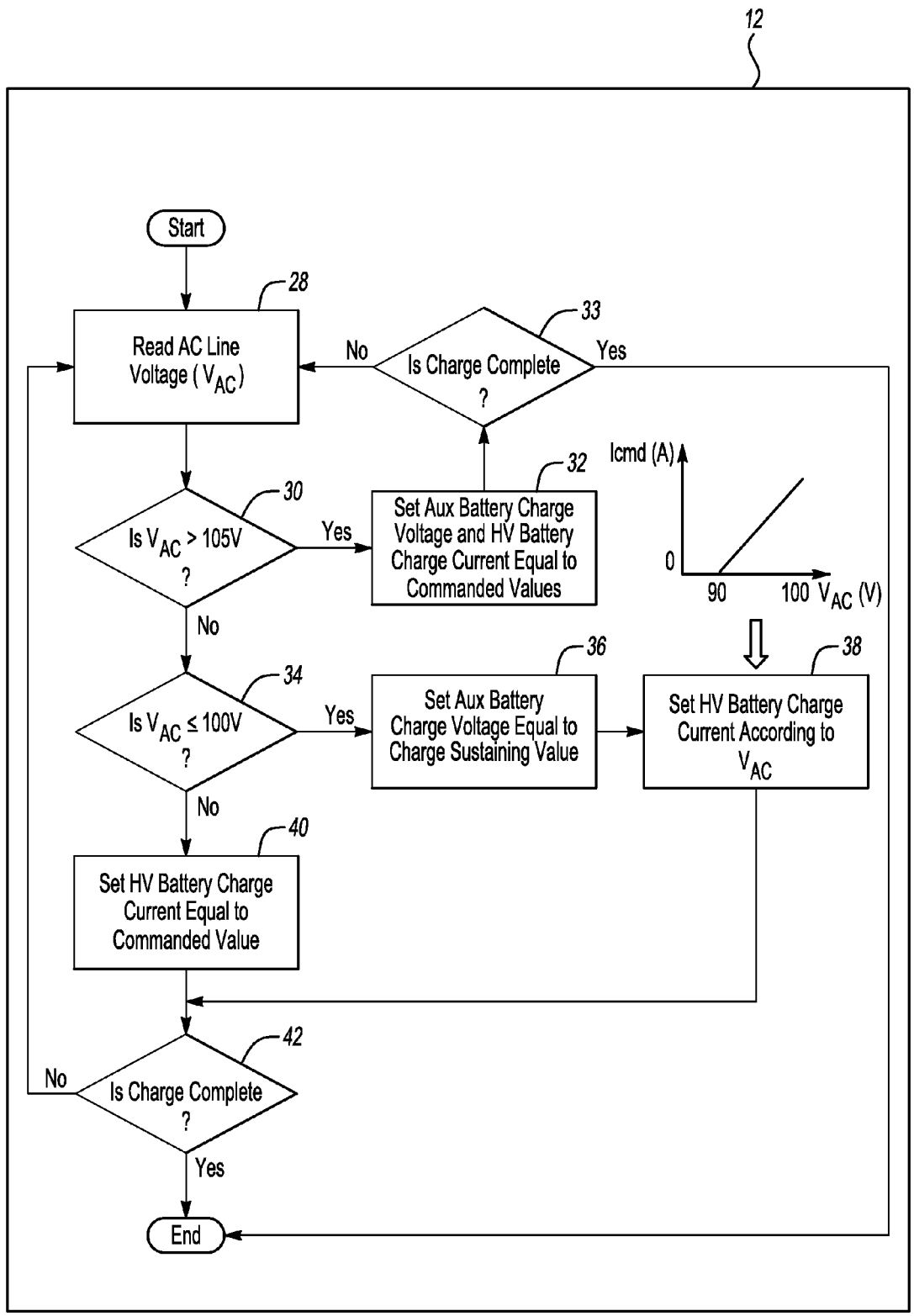
FIG. 2 is a flow chart depicting an algorithm for controlling current flow through the battery charger of FIG. 1.

Referring to FIGS. 1 and 2, the AC line voltage is read at operation 28. For example, the battery charger 12 may measure the AC line voltage in any suitable/known fashion. At operation 30, it is determined whether the AC line voltage is greater than 105 V. The battery charger 12, for example, may compare the measured AC line voltage with a stored value of 105 V to determine which is greater. If yes, the auxiliary battery charge voltage and high voltage battery charge current are set to their commanded values at operation 32. The battery charger 12, for example, may set the current output to the high voltage loads 14 to the value commanded by the controller 18, and set the voltage output set point to the low voltage loads 16 to the value commanded by the controller 18. At operation 33, it is determined whether the battery charge is complete. For example, the battery charger 12 may determine whether its actual state of charge is equal to its target state of charge in any suitable/known fashion. If yes, the algorithm ends. If no, the algorithm returns to operation 28.

Returning to operation 30, if no, it is determined whether the voltage on the AC line is less than or equal to 100 V at operation 34. If yes, the auxiliary battery charge voltage is set to a charge sustaining value at operation 36. The battery charger 12, for example, may set the voltage output set point to the low voltage loads 16 to 13.2 V (or some other charge sustaining value). At operation 38, the high voltage battery charge current is set according to the voltage on the AC line. For example, the battery charger 12 may set the current output to the high voltage loads 14 to zero if the voltage on the AC line is 90 V or less, and proportionally to the voltage on the AC line if the voltage on the AC line is greater than 90 V and less than 100 V according to the following relations:

$$i_{HV} = i_{cmd}, \text{ for } V_{AC} \geq V_{uplim}$$

$$i_{HV} = i_{cmd} * ((V_{AC} - V_{lwrlim})/(V_{uplim} - V_{lwrlim})), \text{ for } V_{lwrlim} \leq V_{AC} < V_{uplim}$$

$$i_{HV} = 0, \text{ for } V_{AC} < V_{lwrlim}$$

where $i_{HV}$ is the high voltage output current, $V_{AC}$ is the voltage on the AC line, $V_{uplim}$ is, in this example, 100V, $i_{cmd}$ is the commanded high voltage output current, and $V_{lwrlim}$ is, in this example, 90 V. At operation 42, it is determined whether the battery charge is complete. For example, the battery charger 12 may determine whether its actual state of charge is equal to its target state of charge in any suitable/known fashion. If yes, the algorithm ends. If no, the algorithm returns to operation 28.

Returning to operation 34, if no, the high voltage battery charge current is set equal to the commanded value. For example, the battery charger 12 may set the current output to the high voltage loads 14 equal to the value commanded by the controller 18. The algorithm then proceeds to operation 42.

The algorithms disclosed herein may be deliverable to/implemented by a processing device, such as the battery charger 12 or controller 18, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed:

1. An automotive vehicle power system comprising:
a battery charger having an input and output and configured to (i) receive electrical energy via the input when the input is electrically connected with an electrical energy source and (ii) reduce a current provided at the output from a commanded value to a target value that varies according to a voltage at the input if the voltage at the input falls within a predetermined range of voltages.

2. The system of claim 1 wherein the battery charger further has a second output and is further configured to reduce a voltage set point of the second output from a commanded value to a target value if the voltage at the input falls within the predetermined range of voltages.

3. The system of claim 2 further comprising an auxiliary battery electrically connected with the battery charger via the second output.

4. The system of claim 1 further comprising a traction battery electrically connected with the battery charger via the output.

5. The system of claim 1 wherein the battery charger is further configured to reduce the current provided at the output from the commanded value or target value to zero if the voltage at the input falls below the predetermined range of voltages.

6. The system of claim 5 wherein the battery charger is further configured to increase the current provided at the output from zero to the target value if the voltage at the input subsequently falls within the predetermined range of voltages.

7. The system of claim 5 wherein the battery charger is further configured to increase the current provided at the output from zero to the commanded value if the voltage at the input subsequently exceeds the predetermined range of voltages.

8. A plug-in hybrid electric vehicle comprising:
an electric machine;
a traction battery electrically connected with the electric machine; and
a battery charger configured to receive electrical energy from an electrical energy source if electrically connected with the electrical energy source and to provide a current to the traction battery at a target value that varies according to a voltage associated with the electrical energy if the voltage associated with the electrical energy falls within a predetermined range of voltages.

9. The vehicle of claim 8 further comprising an auxiliary battery, wherein the battery charger is further configured to reduce a voltage set point of the auxiliary battery from a commanded value to a target value if the voltage associated with the electrical energy falls within the predetermined range of voltages.

10. The vehicle of claim 8 wherein the battery charger is further configured to reduce the current provided to the traction battery to zero if the voltage associated with the electrical energy falls below the predetermined range of voltages.

11. The vehicle of claim 10 wherein the battery charger is further configured to increase the current provided to the traction battery from zero to the target value if the voltage associated with the electrical energy subsequently falls within the predetermined range of voltages.

12. The vehicle of claim 10 wherein the battery charger is further configured to increase the current provided to the traction battery from zero to a commanded value if the voltage associated with the electrical energy subsequently exceeds the predetermined range of voltages.

13. A method of charging a vehicle battery comprising:
determining a voltage on an AC power line electrically connected with an electrical energy source;
determining whether the voltage falls within a predetermined range of voltages; and
outputting a current to a vehicle traction battery at a target value that varies according to the voltage if the voltage falls within the predetermined range of voltages.

14. The method of claim 13 further comprising outputting the current to the vehicle traction battery at a commanded value if the voltage exceeds the predetermined range of voltages.

15. The method of claim 14 further comprising reducing the current output to zero if the voltage falls below the predetermined range of voltages.

16. The method of claim 15 further comprising increasing the current output to the target value if the voltage subsequently falls within the predetermined range of voltages.

17. The method of claim 15 further comprising increasing the current output to the commanded value if the voltage subsequently exceeds the predetermined range of voltages.

18. The method of claim 13 further comprising reducing a voltage set point output to a vehicle auxiliary battery from a commanded value to a target value if the voltage falls within the predetermined range of voltages.

* * * * *